INVENTOR.
HOWARD M. DUSTIN
BY
Clarence W. Martin
AGENT

Sept. 26, 1961 H. M. DUSTIN 3,001,702

CALCULATING MACHINES

Original Filed March 7, 1952 3 Sheets-Sheet 2

Sept. 26, 1961 H. M. DUSTIN 3,001,702

CALCULATING MACHINES

Original Filed March 7, 1952 3 Sheets-Sheet 3

United States Patent Office 3,001,702

Patented Sept. 26, 1961

3,001,702
CALCULATING MACHINES

Howard M. Dustin, Phoenix, Ariz., assignor to Smith-Corona Marchant Inc., a corporation of New York Application Oct. 11, 1954, Ser. No. 461,414, now Patent No. 2,896,846, dated July 28, 1959, which is a division of application Ser. No. 275,259, Mar. 7, 1952, now Patent No. 2,702,668, dated Feb. 22, 1955. Divided and this application Feb. 16, 1959, Ser. No. 793,379
4 Claims. (Cl. 235—63)

The invention relates to ten key calculating machines and particularly concerns means for shifting a plural order actuator carriage relative to a numeral wheel register.

This invention is a division of the United States Patent Application Serial Number 461,414, filed on October 11, 1954, now Patent No. 2,896,846, which application is itself a division of U.S. Patent No. 2,702,668, filed on March 7, 1952. Patent No. 2,702,668 is directed to a calculating machine which is equipped with a decimal point key adjacent a ten key keyboard, whereby the selected numeral and decimal value of a factor is entered into the machine by depressing the numeral keys and the decimal key in the same sequence that the digits and the decimal point appear on paper. A carriage shift control mechanism is effective during such entry to automatically bring the factor into proper decimal alignment with a previously established result decimal point position in the numeral wheel register without the necessity of "pumping in" zeros.

This is accomplished by maintaining the actuator carriage in the extreme left end position during the entry of the factor digits before the decimal point. A shiftable single order entry device is initially in alignment with the leftmost order of the actuator carriage. Depression of one of the ten value entry keys causes entry of a corresponding value in the leftmost order of the actuator carriage and then causes a one step rightward shift of the entry device into alignment with the next lower order of the actuator. The actuator remains stationary during the step-by-step shifting movement of the entry device and the consequent setting of each successively lower actuator order until the decimal point key is depressed.

Depression of the decimal point key releases the actuator carriage for shifting movement toward the right, which movement is arrested by a factor and result decimal means, described in detail in said patent, to thereby bring the factor decimal point into alignment with the previously established position of the result decimal. During the shifting movement of the carriage the entry device is carried with it, and after the actuator carriage is brought into proper decimal alignment with the register, the depression of the numeral keys cause entry of the digits after the decimal point in the factor, and control the step-by-step movement of the entry device incident to the entry of each successive digit. The digits before and after the factor decimal point having thus been entered into the actuators, and the carriage brought to its proper position relative to the result register and its decimal point, the subsequent operation of the machine causes registration of the factor digits in the result register in correct relation to the result decimal point regardless of the variation of the number of digits before or after the decimal point in the factors.

The registration is followed by an automatic return of the carriage and the entry device to their respective left end positions, and then the actuators and the factor decimal point are normalized preparatory to the entry of the next factor.

The previously mentioned application Serial No. 461,414 is directed to the value entry device and the controls for escapement and restore of this device relative to the actuators.

The shift control mechanism of the invention is disclosed as embodied in the machine that is driven by a handcrank and therefore motor power is not available for return of the carriage to its initial position against the spring that shifted it to its decimal aligning position.

An object of the invention is to provide an improved carriage shifting means.

Another object of the invention is to provide two opposed springs, one for shifting the carriage toward the right and the other for shifting the carriage toward the left, together with spring latching, releasing, and recocking means whereby a latch, in one instance, releases the stronger of the two springs and causes shifting of the carriage in one direction against the weaker spring, with means for recocking the stronger spring, and another latch that releases the carriage for return movement under the stress of the weaker spring.

Other objects and advantages will become apparent from the following detailed description of the invention in which.

*General description*

Figure 1:
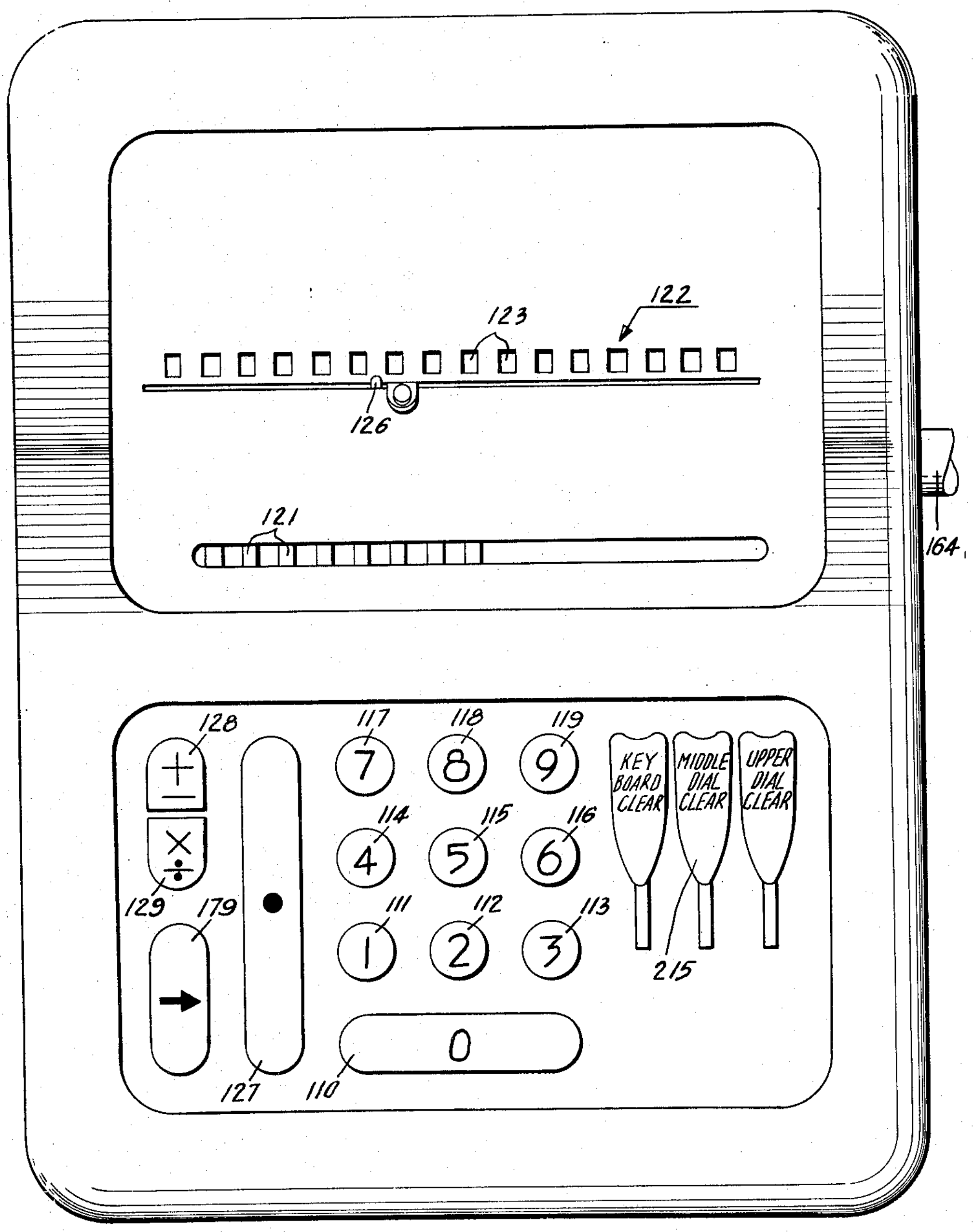
FIG. 1 is an exterior plan view of a machine in which the invention is embodied.

The calculating machine embodying the present invention has ten numeral keys 110–119 (FIGS. 1 and 2), the depression of which is effective through the intermediary of a value entry device 136 (FIG. 2) to enter respective values in the various orders of a numeral wheel actuating mechanism. The value entry device 136 includes a value setting element 139 and a carrier 137 that is shiftable transversely of the machine and in so doing carries the value setting element 139 with it to thereby shift the element into alignment with the various orders of the actuating mechanism.

The actuating mechanism is embodied in a carriage 120 that is mounted for transverse shifting movement relative to the accumulator register. The factor indicator numeral wheels 121 (FIG. 1), which are mounted in the carriage 120, display the value entered in the actuating mechanism. The numeral wheels 123 (FIG. 1) of the accumulater register 122 are advanced during an actuating operation in accordance with the values previously entered into the ordinal actuators.

A result decimal point indicator 126 (FIGS. 1 and 2) for the accumulator register is mounted for sliding movement relative to the various numeral wheels 123 and may be locked in any ordinal position of the register 122. An ordinal decimal point indicator 124 (FIG. 2) is provided adjacent each factor indicator numeral wheel 121, and each indicator 124 is normally hidden from view beneath the cover 125. Depression of the decimal point key 127 moves a selected factor decimal point indicator 124 to a position of display, and also causes the actuator carriage to escape to the right and align the visible decimal point indicator 124 of the factor indicator 121 with the single decimal 126 of the register 122.

A plus-minus key 128 is provided to condition the machine for problems of addition and subtraction, while the multiply-divide key 129 conditions the mechanism for performing multiplication and division and for pointing off the decimal in the product and quotient. This latter mechanism is the subject of U.S. Patent No. 2,773,646 by Walter E. Mathi.

Figure 2:
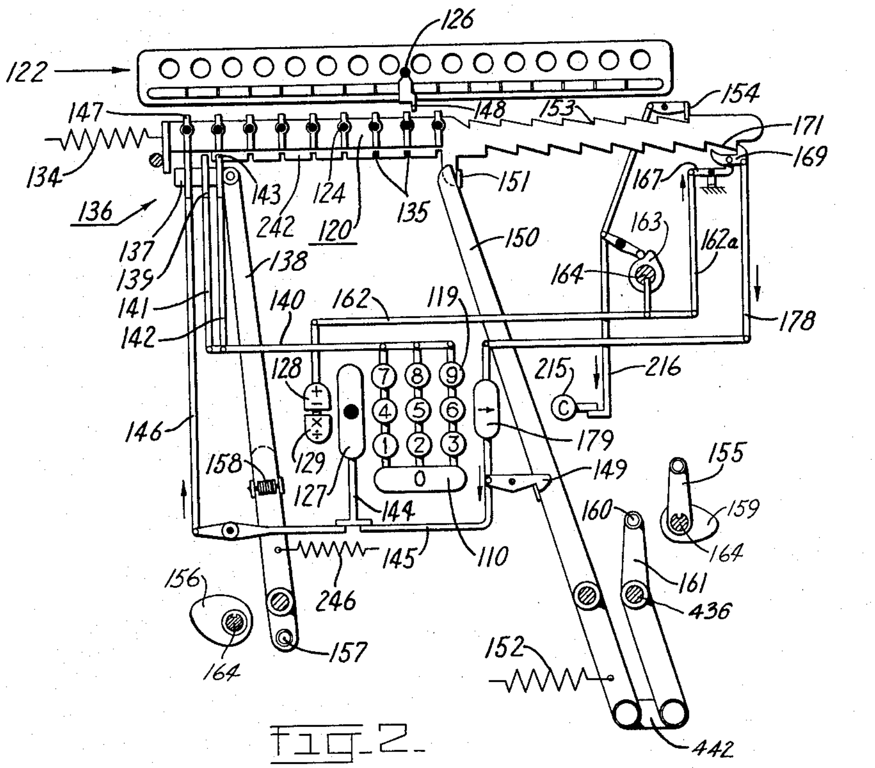
FIG. 2 is a schematic illustration of the invention showing the shifting mechanisms and various related control devices.

The general operation of the machine may be better understood by reference to the schematic illustration shown in FIGURE 2. The accumulator register is indicated at 122 and the actuator carriage is indicated at 120. The latter is shown in its initial leftmost position to which it is urged by a spring 134. The actuator carriage 120 is provided with a series of ordinal notches 135 which serve as an escapement rack for the carrier 137 and the value setting element 139. The carrier is urged to the right by lever 138 and a spring 246, but is normally locked in its initial leftmost position where it is aligned with the leftmost order of the actuator carriage 120.

Figure 3:
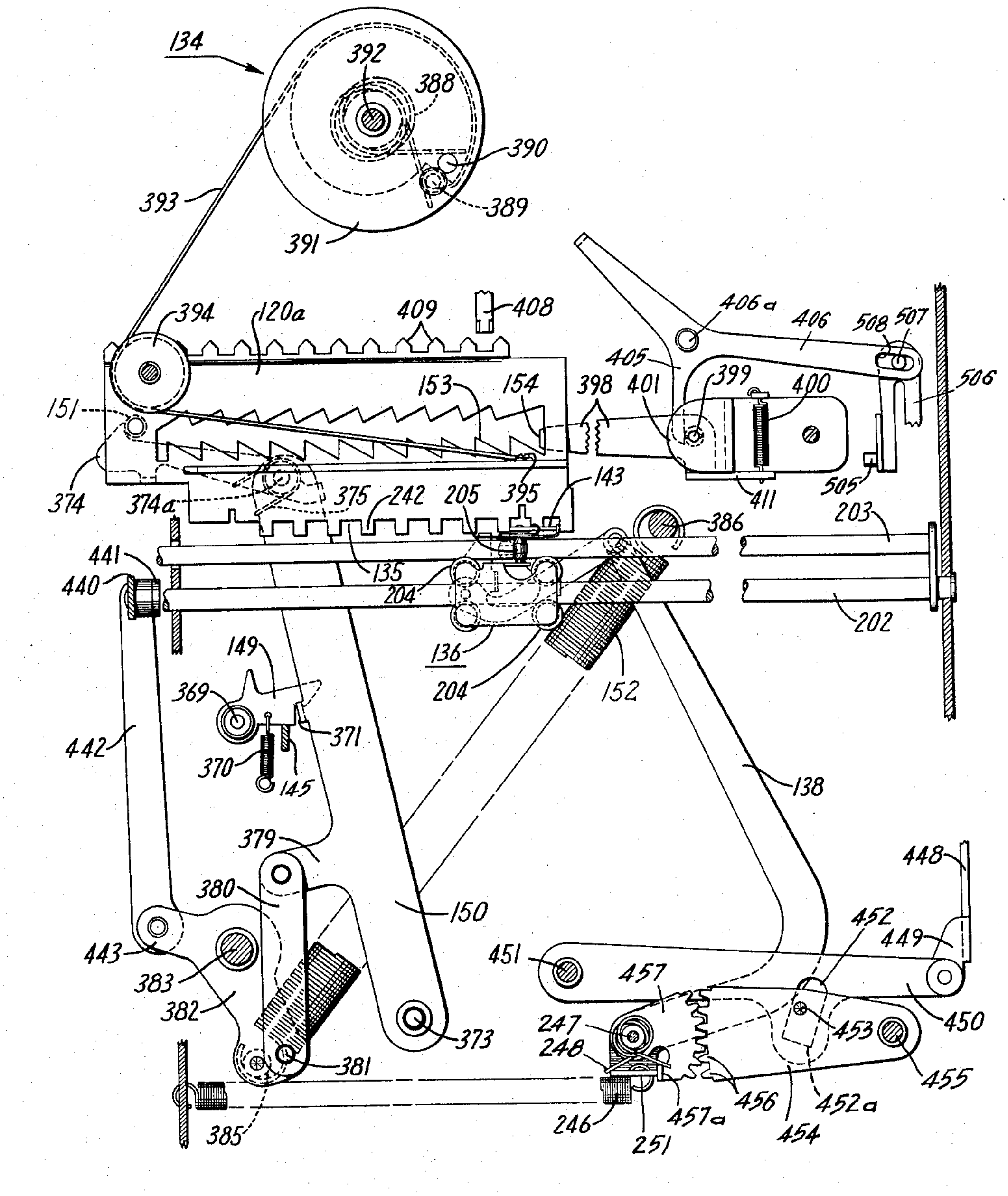
FIG. 3 is a plan view in section of the respective shifting mechanisms for the value entry device and the actuator carriage.

The carrier 137 supports the value setting element 139 which enters values into various orders of the actuating mechanism. Upon depression of keys 110–119, the linkage 140, 141 causes the value setting element to adjust the highest (leftmost) order actuator in accordance with the value of the key depressed. Meanwhile, link 142 is reciprocated by the same numeral key depressed and moves an escapement finger 143 back and forth to cause a one order rightward escapement of the carrier 137 and the value setting element 139 relative to the actuator carriage 120. The carrier is guided for movement by two transverse shafts 202 and 203 (FIG. 3). The carrier 137 carries a set of rollers 204 which contact the transverse shaft 202, and a set of rollers 205 which contact the transverse shaft 203.

The operator continues to depress the keys 110–119 and enter values in successive orders of the actuating mechanism until the decimal point in the factor is reached. Then the decimal key 127 is depressed which moves links 144, 145 and 146 in the direction of the arrows shown in FIGURE 2. Link 146 ejects the one of the stop members 147 with which it is aligned at the time the decimal key is depressed and the normally hidden decimal indicator 124, carried by the ejected stop member, is moved into view. Link 145 moves a latch 149 counterclockwise and releases an actuator carriage shift lever 150 which also may be released by depressing a right shift key 179, as is more fully explained hereinafter. Upon release, the shift lever 150 is moved under the power of a spring 152, whereupon the upper extremity of the lever contacts a lug 151 on the actuator carriage and moves the carriage to the right until such movement is stopped by contact of the ejected stop member 147 with a lug 148 of the register decimal carrier 126. At such time the factor decimal indicator 124 is aligned with the decimal indicator 126 for the accumulator register. During the above-mentioned shifting movement of the actuator carriage 120, a toothed rack 153 integral therewith moves to the right at which time a pawl 154 yields as it slides over the inclined surface of the teeth 153. At the end of the rightward movement of the rack, the pawl 154 engages a respective tooth of the rack to prevent return movement of the actuator carriage 120.

The carrier 137 moves with the actuator carriage 120 during the rightward shifting movement of the latter and at the end of such movement the keys 110–119 may be again depressed to enter into the actuator the digits following the decimal point of the factor. After the selected value is entered, a hand crank 155 (FIGS. 1 and 2) is rotated once in either an additive or subtractive direction to advance the numeral wheels of register 122 in accordance with the values entered into the actuators.

During the latter part of the hand crank cycle the carrier 137 and the actuator carriage are restored to their respective initial positions, and the factor indicator 121 and the ordinal actuators are reset to their initial blank conditions. During the early part of the hand crank cycle a cam 156 (FIG. 2), driven by the crank, contacts a roller 157 carried by the lever 138 and returns the lever and the carrier 137 to their initial leftmost positions with respect to the actuator carriage. A spring yield 158 is provided in case the carrier is restored before the carriage 120 is fully restored.

The actuator carriage 120 is held in its position of decimal alignment with the numeral wheel register 122 throughout the digital actuating operation by the pawl 154 which engages with rack 153. During this actuating operation, the right shift lever 150 is returned and locked in the initial counterclockwise position shown in FIGURE 2 by mechanism including a cam 159 driven by the handcrank, and a latch 149. Cam 159 rocks a lever 161 counterclockwise and through a link 442 restores the right shift lever 150 to its initial position in which it is retained by the latch 149. The spring 134 is therefore enabled to return the actuator carriage to its initial leftmost position when the pawl 154 is removed from restraining engagement with rack 153. For this purpose the depression of the plus-minus key 128 is effective through a link 162 to establish a connection between a cam 163 and the hand crank shaft 164. At the same time links 162 and 162*a* rock a lever 167 clockwise to lower an escapement pawl 169 out of operative relation with an escapement rack 171 fixed to the actuator carriage 120. Then during the latter portion of the hand crank cycle, and after the numeral wheel actuation is completed, the cam 163 withdraws pawl 154 from engagement with rack 153 whereupon spring 134 returns the actuator carriage 120 to its leftmost initial position.

According to the present invention the decimal key 127 is not used in multiplying and dividing operations and all shifting of the actuator carriage is accomplished by depression of a right shift key 179, which is schematically shown in FIGURE 2 and described below in greater detail.

When the multiply-divide key 129 is depressed, the plus-minus key is raised thus moving link 162 in such manner as to break the connection between shaft 164 and cam 163, and also to move link 162*a* and raise the escapement pawl 169 back into operative relation with the rack 171. The disengagement of cam 163 from shaft 164 disables the connection between the hand crank and pawl 154 and the latter therefore remains in position to prevent leftward return shift of the actuator carriage during multicyclic operation of the handcrank in the various orders of the machine.

The raising of the escapement pawl 169 into operative relation with rack 171 enables mechanisms whereby escapement of the actuator carriage to the right may be performed under control of the right shift key 179. Depression of the latter key rocks the latch 149 out of engagement with the shift lever 150 to place the carriage 120 under spring tension for a shift to the right and through link 178 rocks the pawl 169 clockwise to permit a partial escapement of the carriage 120. Release of the shift key 179 permits pawl 169 to return to its initial position shown whereupon the carriage 120 completes its step of escapement. In this manner the carriage may be shifted one or more orders to the right under the control of key 179. During each such escapement, pawl 154 slides over a respective tooth of the rack 153 and reengages with the next tooth thereof.

During multiplying operations the multiplicand is entered into the actuator carriage 120 and then the handcrank is turned a number of times corresponding to the value of the highest order multiplier digit, thus entering the product of the multiplicand times this highest multiplier digit into the product register. Then the right shift key 179 is depressed to escape the actuator to the next lower order of the product register and the above described process is repeated in this order. This continues, order by order, until the entire multiplier value has been entered into the machine at which time the product is shown in the product register. The product decimal point 126 is then manually set in accordance with the total number of decimal places in the multiplicand and multiplier factors.

If it is desired to enter the product around a fixed decimal point in the product register, the multiplicand is entered into the actuator carriage by the numeral keys 110–119 after which the actuator carriage may be shifted under the control of the right shift key 179 one or more orders to the right as required for the particular multiplication problem.

At the conclusion of the multiplying operation the actuator carriage may be returned to its initial position by depressing a clear key 215 (FIG. 2) which moves link 216 in the direction of the arrow, thus rocking pawl 154 counterclockwise out of engagement with the rack 153. At such time the spring 134 returns the carriage 120 to its leftmost position to prepare the machine for the next calculating operation.

*Value entering mechanism*

The value entering mechanism includes the numeral keys 110–119 (FIG. 2) which act through the intermediary of the value entry device 136 to enter values into the actuator carriage 120. Briefly, the depression of a key 110–119 is effective to move the value setting element 139, by an amount corresponding to the value of the key depressed and escape the carrier 137 and the value setting element 139 to the next lower order of the actuating mechanism. These operations are performed by mechanism fully described in U.S. Patent No. 2,702,668, and further description of the value entering mechanism is believed unnecessary.

The entry of ordinal values into the actuating mechanism and into the indicator dials 121 progresses from left to right in the same manner as one would write the values on paper, and when the decimal point is reached, the decimal key 127 (FIGS. 1 and 2) is depressed. The depression of decimal key 127 shifts the actuator carriage 120 to the right to a position of decimal alignment with the product decimal point 126 and sets the decimal point to the right of the last digit entered into the indicator 121. Such shifting is controlled jointly by a selective ordinal stop member 147 (FIG. 2) of the factor decimal point indicator and a stop lug 148 of the product register decimal point indicator.

The rightmost, or last stop member 147 which is so moved is adapted, upon depression of the decimal key and the resulting rightward shifting movement of the actuator carriage, to engage the stop lug 148 of the accumulator register decimal point. The actuators on the actuator carriage 120 are thus positioned in decimal alignment with the accumulator register as described in the last mentioned patent. Subsequent operation of the numeral wheel actuators causes registration of the factor in proper relation to the position of the decimal point in the accumulator register.

*Actuator carriage shifting mechanism*

The spring driven mechanism for moving the actuator carriage to a position of decimal alignment includes the shift lever 150 (FIGS. 2 and 3) which is selectively connected and disconnected from the actuator carriage and is under spring tension to effect the shifting movement when the decimal key is depressed. The connection between the shift lever 150 and the actuator carriage includes a hook 374 (FIG. 3) which is freely pivoted at **374*a* to the upper end of lever 150 and is urged clockwise by a torsion spring 375 into engagement with a roller 151 carried underneath the actuator carriage bottom plate 120*a*. This arrangement provides for constant engagement between the hook 374 and roller 151** throughout the shifting movement of the carriage.

The shift lever 150 is pivotally mounted on a stud 373 fixed to the bottom frame plate of the machine and has an extension 379 which is pivotally connected to a link 380. The opposite end of link 380 is pivotally connected at 381 to a lever 382, freely mounted on a stud 383 carried by the bottom frame plate of the machine, and which lever 382 is urged counterclockwise by the spring 152 connected at one end to a stud 385 on lever 382 and connected at its opposite end to a stud 386 fixed to the bottom frame plate of the machine. The spring 152 therefore tends to move the shift lever 150 and the actuator carriage 120 toward the right, but such movement normally is prevented by the latch 149 which engages a downwardly bent ear 371 on the shift lever 150. Latch 149 is freely pivoted at 369 and is urged clockwise by a spring 370 into restraining engagement with the ear 371, but may be rocked counterclockwise by the depression of the decimal key 127 to release the shift lever 150.

The decimal key 127 (FIG. 1) is suitably guided for up and down movement and a spring attached to the lower end of the key normally holds the decimal key 127 in the raised position. Depression of the decimal key rocks the lever 145 (FIGS. 2 and 3) and moves the latch 149 counterclockwise out of restraining engagement with ear 371. At such time the shift lever 150 is free to move the actuator carriage toward the right.

During rightward shifting of the actuator carriage 120, the value entry device 136 (FIG. 2) and the value setting element 139, carried thereby, are shifted with the actuator carriage since the escapement finger 143 (FIG. 3) of the entry device is engaged with a respective tooth 242 of the escapement rack on the actuator carriage. In this manner the ordinal relationship between the actuator carriage and the entry device is maintained throughout the shifting of the actuator carriage and after such shifting is completed, the numeral keys 110–119 may be depressed to enter values which follow the decimal point into the actuating mechanism.

The previously described rightward escapement of the actuator carriage 120 is powered by the spring 152 (FIG. 3) against the tension of a relatively weaker spring mechanism generally indicated at 134, thereby winding up the latter to provide the power for subsequently returning the actuator carriage to its initial leftmost position. The spring mechanism 134 includes a torsion spring 388, one end of which lies adjacent a stud 389 fixed to the bottom frame plate of the machine and the other end of which spring lies adjacent a stud 390. Stud 390 is carried by a disc 391 freely mounted on a shaft 392 fixed to the bottom frame plate of the machine. Spring 388 urges the stud 390 and the disc 391 clockwise, and through a tape 393, connected at one end to the disc 391 and at 395 to the actuator bottom plate **120*a*, constantly urges the actuator carriage toward the left. The idler pulley 394** for the tape is freely mounted on a post fixed to the machine framework.

The shift lever 150 is returned and locked in the initial counterclockwise position shown in FIGURES 2 and 3 during the early part of the hand crank cycle, and such return occurs before the actuating cycle is completed. Means including an escapement pawl 398 and a centralizer pawl 408 are therefore provided to prevent the spring mechanism 134 from returning the actuator carriage to its leftmost position until after the actuating cycle is completed. Pawl 398 has an upstanding ear 154 which is adapted to engage with a toothed rack 153 formed on the actuator carriage bottom plate **120*a* to hold the actuator carriage in any escaped position thereof against the tension of the spring mechanism 134. The pawl 398 is pivotally mounted on a pin 399 and has an extension 411 (FIG. 3) to which is connected a spring 400 urging the pawl counterclockwise to the position shown in FIGURE 3. During shifting of the carriage to the right in response to depression of the decimal key, the teeth of rack 153 exert a camming action on the pawl 398** and move the pawl clockwise out of engagement with successive teeth until such shifting is completed, whereupon the pawl re-engages a respective tooth of the rack.

The ear 154 of pawl 398 is later moved downwardly out of the plane of the rack 153 to permit the return of the carriage 120 to its leftmost position and for this purpose the pivot pin 399 for the pawl 398 is suspended at its upper end from a bracket 401. A keeper pin carried by the pivot pin 399, rests above the upper portion of the bracket 401. The pawl 398 is mounted on the suspended pin 399 and swings to cause in and out movement of the ear 154 relative to the rack 153 during the previously described leftward shifting of the actuator carriage 120. The ear 154 is continually urged upward into the rack by a spring (shown in U.S. Patent No. 2,702,668) which is connected to the lower end of pin 399.

Early in the cycle of rotation of the hand crank the centralizer pawl 408 (FIG. 3) is moved into engagement between respective teeth of a rack 409 on the actuator carriage bottom plate 120*a*, and holds the actuator carriage 120 in its shifted position until near the end of the cycle. The escapement pawl 398 therefore may be disengaged from the rack 153 any time after the centralizer pawl 408 is engaged with rack 409. In this manner the machine is conditioned to permit the spring mechanism 134 to return the actuator carriage to its leftmost position when the centralizer pawl 408 is withdrawn from engagement with rack 409.

The centralizer pawl 408 is fully described in U. S. Patent No. 2,702,668 and serves merely to insure that the actuator carriage 120 is correctly aligned with the register during actuation. The cyclic time at which the pawl tooth 154 and the pawl 408 are disabled therefore could be reversed allowing the pawl 408 to be removed following actuation but before pawl tooth 154. It will be apparent that the functions of pawl 408 and pawl tooth 154 overlap and pawl 408 could be eliminated without impairing the operation of the machine.

From the foregoing description it is seen that the shifting of the actuator carriage to a position of decimal alignment with the accumulator register is under the control of the decimal key and the respectively set positions of the decimal point indicators 126 and 124, and that the return of the carriage to its initial position is under the control of the hand crank.

*Main drive mechanism*

The main drive mechanism comprises the hand crank 155 (FIG. 4), the shaft 164 to which the crank is fixed, and respective gear drives from shaft 164 to shaft 274 and other shafts in the machine.

The shaft is driven by the hand crank 155 (FIG. 4) through gears 301 and 300. Shaft 274 carries the ordinal actuators for the accumulator register, and each complete rotation of the hand crank in either direction causes a single cycle of additive or subtractive actuation of the numeral wheels.

Shaft 274 also carries a cam 159 (FIG. 4) which returns the shift lever 150 (FIG. 3) from any shifted position thereof to its initial leftmost position. A follower lever 161 (FIG. 2), freely pivoted at 436 to the machine frame work, carries a roller 160 for contact with the periphery of cam 159 and is spring urged to hold the roller 160 against the cam. The follower lever 161 is connected by linkage including the link 442 to the shift lever 150.

When shaft 274 is rotated in either a clockwise or counterclockwise direction during negative or positive actuation, respectively, the cam 159 (FIG. 4) moves the follower 161 (schematically shown in FIG. 2) clockwise and the follower 161 is therefore effective through link 442 (FIG. 3) to restore the bell crank 382 to the initial position shown in FIGURE 3. In the schematic illustration shown in FIG. 2, the lever 150 is connected to link 442 whereas in the physical embodiment shown in FIG. 3, the bell crank 382 and link 380 actually serve as a part of an articulated linkage between the cam 159 and lever 150. The bell crank 382 is effective through link 380 to restore the shift lever 150 to its initial leftmost positions whereupon the latch 149 re-engages ear 371 and locks the shift lever 150 in its initial position. At such time spring 152 is tensioned and remains in this condition until the decimal key is again depressed.

Figure 4:
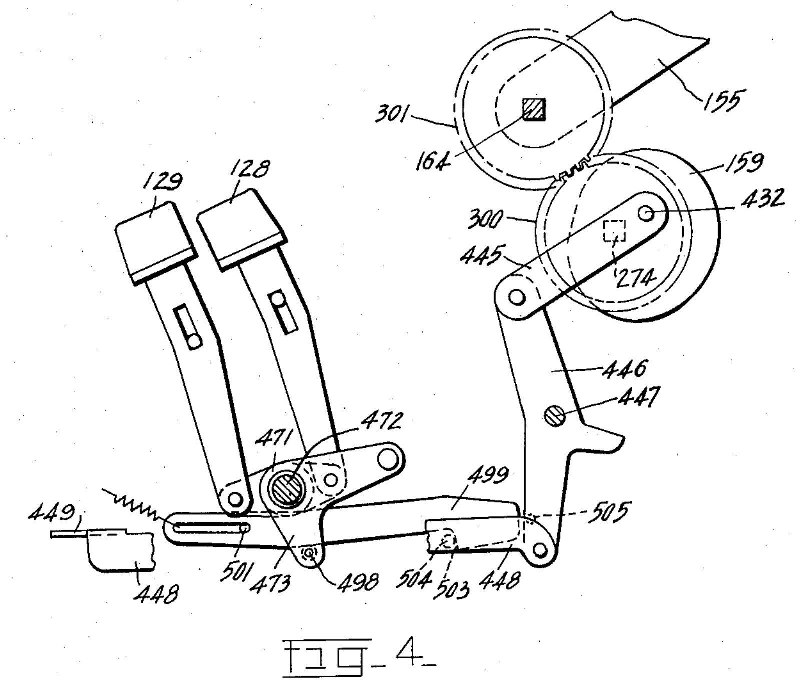
FIG. 4 is a right side view of a mechanism for enabling and disabling the return shift mechanism for the actuator carriage.

The rotation of the hand crank also restores the value entry device 136 (FIG. 3) to its initial leftmost position relative to the actuator carriage rack. The previously mentioned gear 300 (FIG. 4) which is fixed to shaft 274, carries a crank pin 432 (FIG. 4) and the upper end of a link 445 is freely mounted on the crank pin. The lower end of link 445 is pivotally mounted on the upper end of a bell crank 446 pivoted on a stud 447. The lower end of bell crank 446 is connected to a link 448 and the opposite end of the link has an ear 449 (FIGS. 3 and 4). A lever 450 (FIG. 3) is pivotally connected to ear 449 and is freely mounted on a stud 451 carried by the bottom frame plate. The crank pin 432 (FIG. 4) is therefore effective through the above linkage to rock the lever 450 (FIG. 3) counterclockwise and this rocking movement is transmitted through mechanism now described to a restore lever 138 for the entry device 136.

Lever 450 has an aperture 452 which embraces a pin 453 fixed to the bottom of a gear segment 454. The latter is freely mounted on a stud 455 and has gear teeth 456 meshed with a second gear segment 457. Gear segment 457 is freely mounted on stud 247 and has an upstanding ear 457*a* which normally lies adjacent the ear 251 of the previously mentioned lever 138. A torsion spring 248 urges segment 457 clockwise against the ear 251 so that segment 457 and lever 138 normally act as an integral unit. During the entry of values into the actuator, the lever 138 and spring 246 urge the value entry device 136 to the right and the latter is escaped one order toward the right for each ordinal entry made into the actuating mechanism. At the end of such entry the lever 138 therefore stands in a clockwise position such as that shown in FIGURE 3, and through the urgency of the torsion spring 248, the segment 457 rotates clockwise with lever 138. The clockwise movement of segment 457, in turn, causes counterclockwise movement of segment 454 and moves the pin 453 counterclockwise a limited amount within the aperture 452.

In FIGURE 3, the entry device 136 is shown in its rightmost escaped position relative to the actuator escapement rack 135, and in which position the pin 453 lies in the middle of aperture 452. When the decimal key is depressed and the actuator carriage 120 is shifted toward the right, as previously described, the entry device 136 is shifted further toward the right with the actuator carriage. Such rightward movement of the device 136 causes additional clockwise movement both of lever 138 and the segment 457 and therefore moves segment 454 and pin 453 further counterclockwise from the position shown in FIGURE 3.

With the pin 453 lying in any position within the aperture 452, the rotation of crank pin 432 (FIG. 4) and the counterclockwise movement of lever 450 (FIG. 3) causes the lower end 452*a* of slot 452 to contact the pin 453 and move the pin and the gear segment 454 clockwise. The other segment 457 is therefore rotated counterclockwise, thus tensioning the spring 248 and causing lever 138 to be rocked counterclockwise against the tension of spring 246. This returns the entry device 136 to its initial leftmost position relative to the actuator rack 135. If this position is reached before the lever 450 is moved the full extent provided, then the torsion spring 248 merely yields to permit such movement. In the foregoing description it will be noted that the crank pin 432 (FIG. 4) and associated linkage is the equivalent of the cam 156, schematically shown in FIGURE 2.

During problems of addition and subtraction the actuator carriage, as described, is returned to its initial leftmost position during the latter part of each cycle of operation of the handcrank. For this purpose the handcrank and related mechanisms are effective first, to remove the pawl tooth 154 (FIG. 3) from engagement with the actuator carriage rack 153 and then to remove the centralizer pawl 408 from engagement with rack 409. This releases the actuator carriage to the control of the spring mechanism 134 which then effects the return shifting operation.

The mechanism for withdrawing the tooth 154 from rack 153 includes the previously mentioned link 448 (FIG. 4) which is moved to the right and then restored by the crank pin 432. Link 448 carries a pin 504 lying adjacent a hook 503 formed on a member 499. The latter is slidably mounted on a pin 501 and is further supported by a roller 498 carried by a lever 473. The lever 473 and an integral double armed lever 471 are pivotally mounted on a shaft 472. The plus-minus key 128 and the multiply-divide key 129 are pivotally connected to the opposed arms of lever 471. With the plus-minus key 128 in the depressed position in FIGURE 4, the roller 498 holds the slide 499 in the position shown so that the rightmost end of the slide 499 lies adjacent a pin 505 (FIGS. 3 and 4) projecting from a second slide 506. It will be apparent that when the multiply-divide key 129 is depressed the roller 498 rocks the slide 499 upwardly from the position shown and moves the hook 503 out of the path of pin 504. In FIGURE 4, however, slide 499, and the slide 506 are connected together and move as an integral unit. Slide 506 (FIG. 3) has a horizontally formed portion lying flat on the bottom frame plate and guided by a pin projecting from the plate. Slide 506 carries a pin 507 which projects through a slot 508 in a bellcrank 406 pivotally mounted at 406*a* to the bottom frame plate and having an arm 405 lying adjacent the previously described pin 399. It is evident, therefore, that the rightward movement of the link 448 (FIG. 4) together with the slides 499 and 506 causes the bellcrank 406 (FIG. 3) to rock counterclockwise thus rocking the pin 399 and pawl 398. This movement of pawl 398 removes tooth 154 from restraining engagement with rack 153.

The pawl 398 must be held disabled in its depressed position until after the centralizer pawl 408 (FIG. 3) is removed from rack 409 to release the actuator carriage for its return movement, and suitable mechanism for locking the pawl 398 in its depressed position is described in the previously mentioned patent.

At this time the entire machine is restored to its initial condition with the exception that the accumulator register shows the value entered therein and the counter register shows the item count. The next value to be accumulated may then be entered into the machine by depression of the ten entry keys and the decimal key, as previously described, after which the handcrank is rotated once to advance the numeral wheels of the accumulator register in accordance with the value selected and to restore the machine to a condition in which another value may be entered.

The invention claimed is:

1. In a calculating machine having a shiftable carriage, and spring means for shifting said carriage in either of two opposite directions, selectively, including the combination of, a first spring for urging said carriage in one direction, and a second spring capable of overcoming said first spring and in so doing shifting the carriage in the opposite direction, with means including a manually operable key for connecting said second spring to the carriage for shifting the carriage in said opposite direction toward a given position, means for disconnecting said second spring from the carriage, means for retaining the carriage in said given position against the power of said first spring during said disconnecting, and a second manually operable key for releasing said carriage from restraint of said retaining means.

2. In a calculating machine having a shiftable carriage, and spring means for shifting said carriage in either of two opposite directions, selectively, including the combination of, a first spring for urging said carriage in one direction, and a second spring capable of overcoming said first spring and in so doing shifting the carriage in the opposite direction, with means including a manually operable key for enabling said second spring for shifting the carriage in said opposite direction toward a given position, cyclically operable drive means for first disabling the second spring and then restoring the power in said second spring, means for retaining the carriage in said given position against the power of said first spring during such power restoration, and releasing means operable by said drive means near the end of its cycle to release said carriage from restraint of said retaining means.

3. In a calculating machine, a shiftable carriage having a plurality of positions, and spring means for shifting said carriage in either of two opposite directions selectively, including the combination of, a first spring for urging said carriage toward the left, and a second spring capable of overcoming said first spring and in so doing shifting the carriage toward the right, with means including a manually operable key for enabling said second spring for shifting the carriage from a left end position to a given intermediate position, cyclically operable drive means for first disabling the second spring and then restoring the power in said second spring, means for retaining the carriage in said intermediate position against the power of said first spring during such power restoration, and releasing means operable by said drive means near the end of its cycle for releasing said retaining means to enable said first spring to return the carriage to said left end position.

4. A calculating machine as defined in claim 3 including means selectively settable to connect or disconnect the releasing means from said drive means.

References Cited in the file of this patent

UNITED STATES PATENTS

| | | |
|---|---|---|
| 2,560,910 | Toorell et al. | July 17, 1951 |
| 2,645,422 | Pfleger | July 14, 1953 |

FOREIGN PATENTS

| | | |
|---|---|---|
| 620,175 | Great Britain | Mar. 21, 1949 |